United States Patent [19]

Arai

[11] Patent Number: 5,276,890
[45] Date of Patent: Jan. 4, 1994

[54] RESUME CONTROL SYSTEM AND METHOD FOR EXECUTING RESUME PROCESSING WHILE CHECKING OPERATION MODE OF CPU

[75] Inventor: Makoto Arai, Tokyo, Japan

[73] Assignee: Kabushiki Kaisha Toshiba, Kawasaki, Japan

[21] Appl. No.: 29,953

[22] Filed: Mar. 9, 1993

Related U.S. Application Data

[63] Continuation of Ser. No. 938,667, Sep. 1, 1992, abandoned, which is a continuation of Ser. No. 578,446, Sep. 7, 1990, abandoned.

[30] Foreign Application Priority Data

Nov. 30, 1989 [JP] Japan .................. 1-309124

[51] Int. Cl.$^5$ .......................... G06F 12/16
[52] U.S. Cl. ................... 395/750; 395/700;
364/DIG. 1; 364/232.9; 364/254.8; 364/273.1;
364/273.4; 364/285.2; 364/280.3; 364/261.5
[58] Field of Search ............ 364/DIG.; 395/575, 750

[56] References Cited

U.S. PATENT DOCUMENTS

| | | | |
|---|---|---|---|
| 4,234,920 | 11/1980 | Van Ness et al. | 364/200 |
| 4,412,284 | 10/1983 | Kerforne et al. | 364/200 |
| 4,458,307 | 7/1984 | McAnlis et al. | 364/200 |
| 4,907,150 | 3/1990 | Arroyo et al. | 364/200 |

FOREIGN PATENT DOCUMENTS

| | | |
|---|---|---|
| 0197552 | 10/1986 | European Pat. Off. . |
| 0230351 | 7/1987 | European Pat. Off. . |
| 0256815 | 2/1988 | European Pat. Off. . |

OTHER PUBLICATIONS

Byte, pp. 313-318, Dec., 1990, O. Linderholm, "Portable Chips".
Microprocessor Report, vol. 4, No. 18, pp. 3-6 and 9-15, Oct. 15, 1990, M. Slater.
Electronic Engineering Times, Dec. 17, 1990, Issue 621, M. Slater, "Chips Become Systems".
Electronic Engineering Times, Oct. 22, 1990, Issue 613, S. Baker, "Silicon Bits".
Electronic Engineering Times, Oct. 15, 1990, Issue 612, 2 pages.
Infoworld, vol. 12, issue 42, Oct. 15, 1990, 3 pages.
Electronic News, vol. 36, No. 1831, p. 43, Oct. 15, 1990, "Intel Enters Market With 386 Chip-Sets For PCs".
PC Week, vol. 17, No. 41, p. 6.
PC Week, Nov. 12, 1990, p. S/28.
PC Week, p. 29, Nov. 12, 1990.
PC Week, pp. 14 and 18, Nov. 12, 1990.
Intel, 386 SL Microprocessor Superset: Programmer's Reference Manual, 1990.

Primary Examiner—Thomas M. Heckler
Attorney, Agent, or Firm—Oblon, Spivak, McClelland, Maier & Neustadt

[57] ABSTRACT

A CPU to be operable in at least first and second modes is used to execute a resume processing program set to be executed only in the first mode. In the case where resume processing is carried out if the power supplied from a power source is cut off when the CPU is operating in the second mode, the second mode is saved in a backup RAM, and the CPU is set to operate in the first mode in which the resume processing program can be executed. Upon restoration of the power source, restoring procedure is carried out. After the restoring procedure is completed, the CPU is set to operate in the second mode saved in the backup RAM, and resumes the interrupted processing.

50 Claims, 5 Drawing Sheets

RESUME CONTROL SYSTEM AND METHOD FOR EXECUTING RESUME PROCESSING WHILE CHECKING OPERATION MODE OF CPU

This application is a continuation of application Ser. No. 07/938,667, filed on Sept. 1, 1992, now abandoned, which is a continuation of Ser. No. 07/578,446, filed Sept. 7, 1990, also now abandoned.

BACKGROUND OF THE INVENTION

1. Field of the Invention

This invention relates to a resume control system suitable for a personal computer having a resume function and also to a method used in the system.

2. Description of the Related Art

The development of semiconductor technology has enabled microprocessors and memory LSIs of high performance to be manufactured at very low cost. In particular, some of these microprocessors can simultaneously perform 8-bit processing, 16-bit processing, and 32-bit processing, and hence can process data at high speed. The following products, made by Intel Co., Ltd in the U.S.A., and generally used in personal computers, are listed as such microprocessors: iAPX86 (8086), iAPX88 (8088), iAPX186 (80186), iAPX286 (80286), and iAPX386.

The iAPX286, for example, can operate in two modes, i.e., real address mode and protective virtual address mode. In the real address mode, a memory having a capacity of less than 1 MB can be accessed, and the programs made for iAPX86 or iAPX186 also can be executed without being modified. In the protective virtual mode, a memory having a capacity of 1 MB or more can be memories such as a virtual memory. The protective virtual mode and real address mode are determined by setting and resetting a protection enabling bit provided in the iAPX286, respectively.

The memories are addressed by the use of segment registers and offset registers in the real address mode, and addressed by the use of global descriptor tables (GDT), segment selectors, and offset registers, in the protective virtual address mode.

A personal computer, using the iAPX286 and having a resume function, has been developed in recent years.

Heretofore, most application programs were prepared using microprocessors prior to the introduction of the iAPX286 microprocessor. In recent years, however, various application programs which are executed in the protective virtual mode are being prepared. Accordingly, there is a desire to be able to effect the resume function in the protective virtual address mode as well.

However, the conventional resume processing programs can be executed in the real address mode only. As is described above, the memories are addressed in different ways between the real address mode and protective virtual address mode. Accordingly, these conventional programs cannot be executed in the protective virtual address mode, unless they are modified. Alternatively, it costs a lot to However, a complicated control would be required in order to allow a resume processing program adapted for execution in the real address mode to also be effective in the virtual address mode. prepare respective resume processing programs for the real address mode and protective virtual address mode.

The present invention is related with the inventions disclosed in the following U.S. Patent applications assigned to the present assignee.

U.S. Pat. application No. 343,356 filed Apr. 26, 1989 (Title: Method and System for Resuming Data Processing in Computer; Inventor: Toshimitsu SAITO) discloses a method and a system for resuming data processing. In this method, the resuming mode is set after the computer system is bootloaded. When the power switch is turned off, the power source generates a power switch-off signal. In the resume mode, the system data is stored in a file upon detection of the power switch-off signal. After a predetermined period of time has elapsed from the switch-off, or if a signal is generated for indicating that the storage of the system data has been completed, the power is cut off. When the power switch is turned on again, the initialization of memories and the like, and the system data stored in the file are read out of it, and then restored in the memories. Thus, the data processing can be resumed in the state of the system having been assumed immediately before the power switch was turned off.

U.S. Pat. application No. 507,490 filed Apr. 11, 1990 (Title: Computer Having Resume Function; Inventor: Shizuka GUNJI) discloses a computer having a resume function. In this system, it is first selected whether or not to enable the resume function, and whether or not to check a password. If it is selected to enable the resume function, and to check the password, the data processing system commands that one should input the password upon turning on the power switch. When the password is input by the use of the keyboard or the like, the data processing system performs resume processing. If the correct password is not input, the resume processing is inhibited, which prevents the stored data from being known or broken into by a third party.

U.S. Pat. application No. 540,643 filed Jun. 19, 1990 (Title: Computer Having A Resume Function And Operable On An Internal Power Source; Inventors: Toshimitsu SAITO; Junko KONNO) discloses a computer having a resume function and operable by a battery, which incorporates a circuit for checking voltage output from the battery, and a control circuit. If the voltage output from the battery is reduced lower than a predetermined value during processing, the resume processing is executed to protect data, irrespective of whether or not the resume mode is set, thereby storing the data processing then having been executed. When the output voltage of the battery is returned to more than the predetermined value, the data processing is resumed from the interrupted state.

U.S. Pat. application No. 549,934 Title: Method And System For Performing Display Data Resuming Process; Inventor: Makoto ARAI; Priority Date: Jul. 11, 1989) discloses a method and a system for executing the resume processing of display data. This method is applied to a personal computer having no backup batteries for a display memory owing to restrictions in the design of the hardware. The power switch is turned off after the data stored in the display memory is stored in the backup memory of a system memory having its own backup battery. When the power switch is turned on again, the display data stored in the backup memory is restored in the display memory. In this way, the display data, stored in the display memory immediately before the turn-off of the power switch, can be restored in the display memory.

SUMMARY OF THE INVENTION

An object of the present invention is to provide a resume control method and a system which can be operated with a simple control both in real address mode in which the CPU accesses a memory address space within a 1 Mbyte range and in protective virtual address mode; in which the CPU accesses an address space larger than 1 Mbyte by using a single resume processing program.

According to a first aspect of the invention, a resume control method for a portable computer provided with a central processing unit (CPU) operable in at least first and second modes, wherein in said first mode the CPU accesses a first memory address space, and in said second mode the CPU accesses a second memory address space larger than the first memory address space, the CPU being capable of executing a resume processing program upon an interrupt in processing, said program set to be executed in one of the first and second modes, comprises the steps of: a) determining and saving in a backup memory either the first mode or the second mode depending on which mode the CPU is operating in, by referring to data indicating either the first or the second mode, upon occurrence of an interrupt signal; b) setting the CPU to operate in one of the first and second modes in which the resume processing program can be executed; c) saving, upon the occurrence of the interrupt signal, system data indicative of conditions in which the CPU had been operating prior to the occurrence of the interrupt signal; d) restoring the system data saved in step c), in response to a power-on signal; e) setting the CPU to operate in the same mode as the CPU had been operating in upon the occurrence of the interrupt signal; and f) resuming the interrupted processing.

According to a second aspect of the invention, a computer apparatus comprises: a central processing unit (CPU) operable in at least first and second modes wherein in said first mode the CPU accesses a first memory address space and in said second mode the CPU accesses a second memory address space larger than the first memory address space, the CPU being capable of executing a resume processing program set to be executed in one of the first and second modes; power source means, connected to the CPU, for supplying power to the CPU; detecting means, connected to the power source means, for detecting a status of power in the power source means; storing means, connected to the detecting means, for storing the first or the second mode depending on which mode the CPU is operating in, upon detection of a change of the status of power in the power source means; setting means, connected to the CPU, for setting the CPU to operate in one of the first and second modes in which the resume processing program can be executed; saving means, connected to the CPU and the detecting means, for saving system data indicative of conditions of a program which was being executed by the CPU upon the detection of a power-down signal; restoring means, connected to the detecting means and the saving means, for restoring the saved system data upon the occurrence of a power-on signal; and means, connected to the restoring means, for resuming the processing which was being executed by said CPU from a state when the system data has been saved, in accordance with the system data restored by said restoring means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
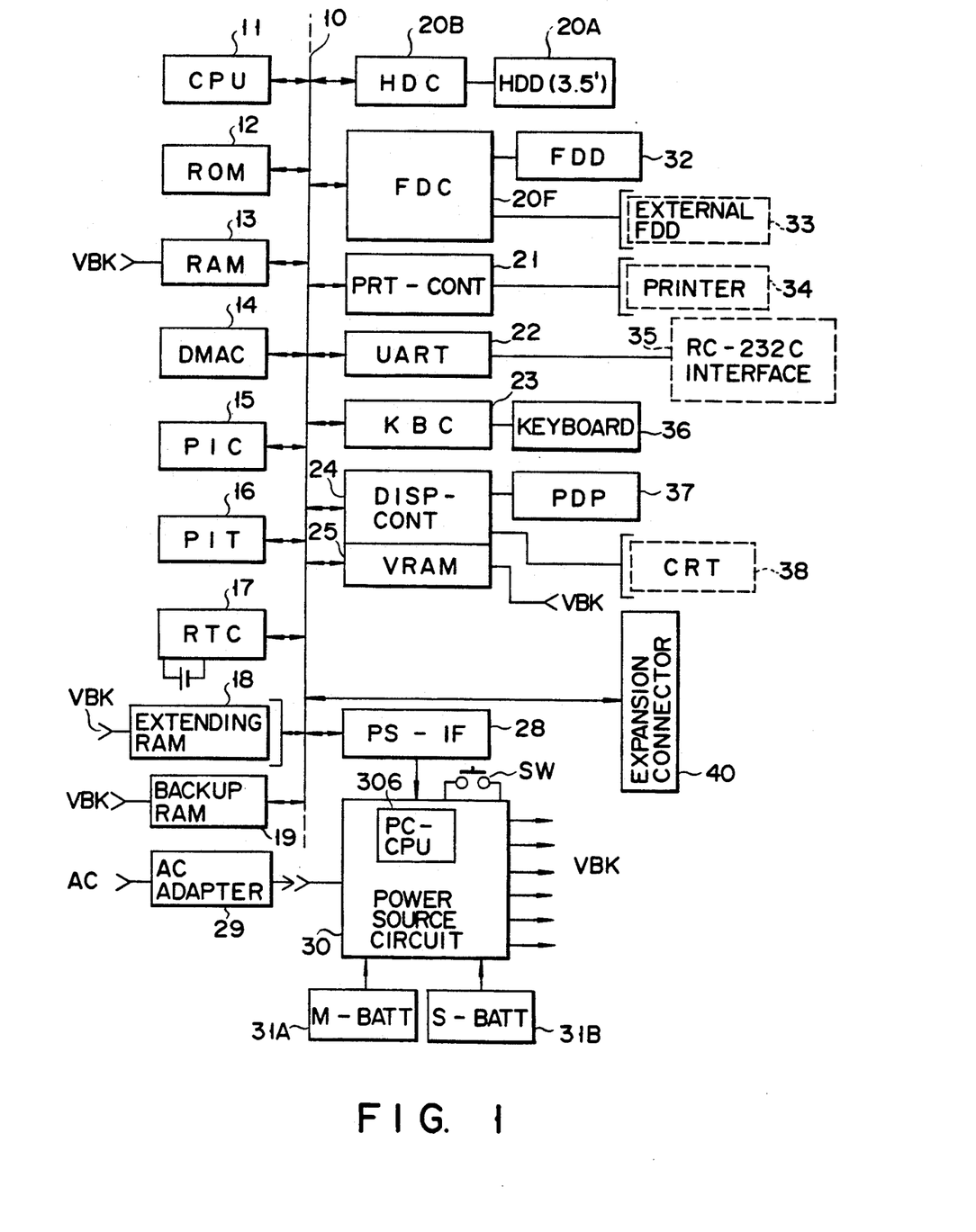
FIG. 1 is a system block diagram of a personal computer to which resume control system and method according to the invention are applied.
Figure 3:
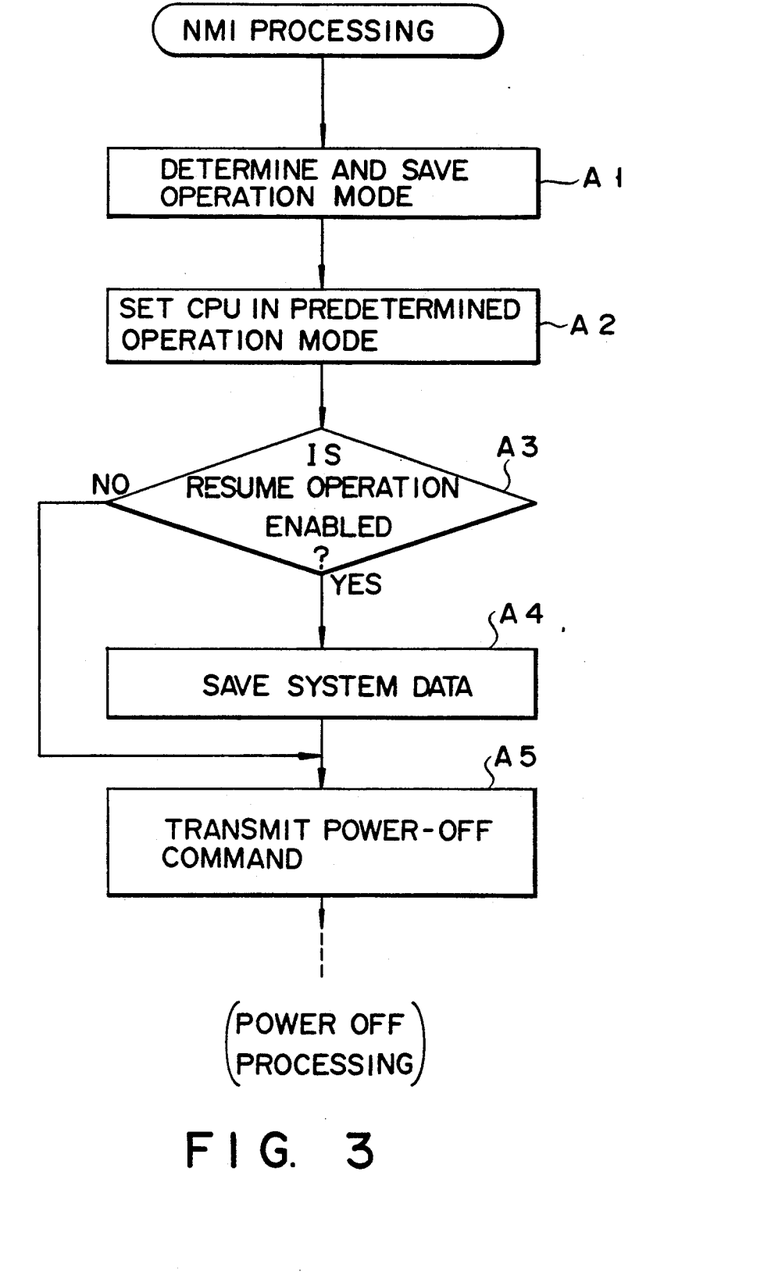
FIG. 3 is a flowchart of NMI processing executed in the resume-control system and method of the present invention.
Figure 4:
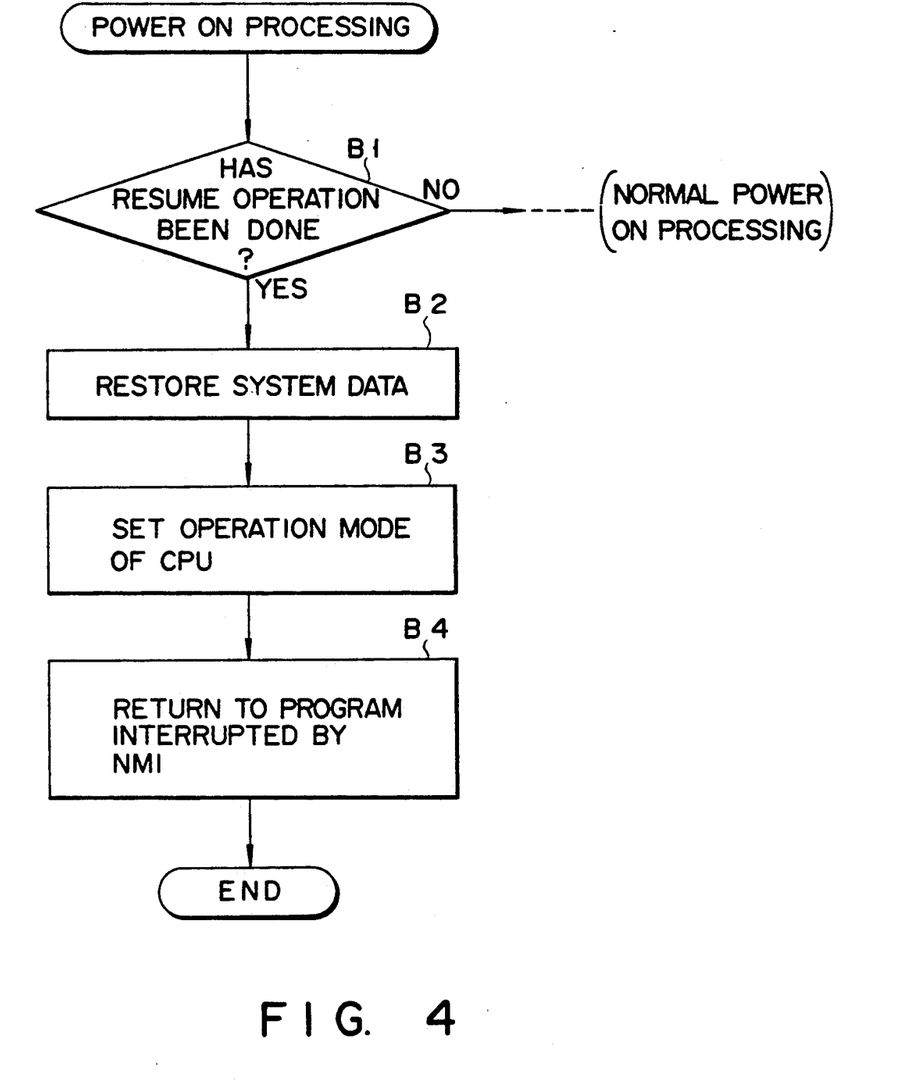
FIG. 4 is a flowchart of power-on processing executed in the resume control system and method of the present invention.
Figure 5:
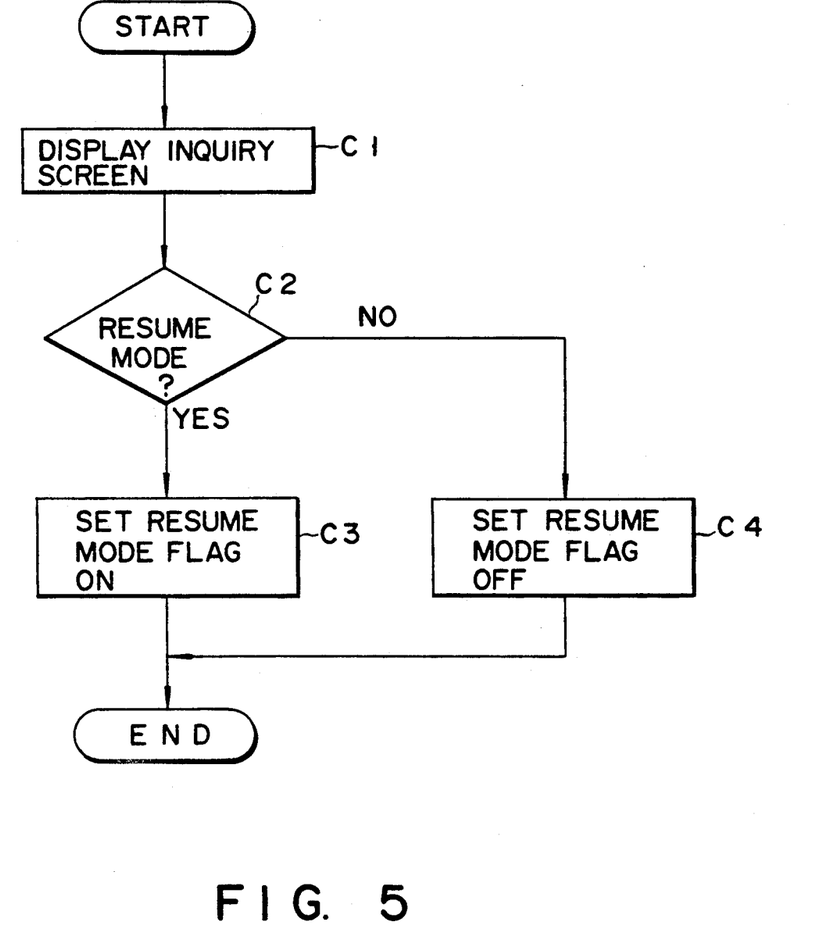
FIG. 5 is a flowchart of resume mode-setting processing executed in the resume-control system and method of the invention.

FIG. 1 is a system block diagram of a personal computer system to which a resume control system and a method of the present invention are applied. As shown in FIG. 1, a system bus 10 is connected to components 11 to 25. A CPU 1 controls the entire system. In this embodiment, the CPU 11 has functions as shown in the flowcharts of FIGS. 3 to 5, and serves as a host CPU viewed from a power control CPU 306 in a power source circuit 30 to be described later.

A ROM 12 stores fixed programs, data and the like. A RAM 13 stores programs and data, to be processed, and also stores a resume mode flag, to be described later, and the like. A DMA controller 14 controls a direct memory access.

A PIC (Programmable Interrupt Controller) 15 can be set by a program, and outputs an interrupt signal. A PIT (Programmable Interval Timer) 16 can be set by a program, and downcounts a set time period. An RTC includes a CMOS RAM backed up by a dedicated power battery and holds system configuration data set by a system setup routine. An extension RAM 18, having a relatively large memory capacity, is removably inserted in a dedicated card slot of a main body, and is supplied with a backup power (VBK). A backup RAM 19 stores data for realizing a resume function, system data and a system data flag, to be described later. The RAM 19 is supplied with a backup power (VBK).

A hard disk pack 20 is removably inserted in a dedicated housing section of a main body, and comprises a hard disk drive (HDD) 20A of, for example, 3.5 inches, and a hard disk controller (HDC) 20B for controlling the accessing by the drive 20A. Reference 20F designates a floppy disk controller (FDC); 21, a printer controller (PRT-CNT); 22, an input/output interface (UART; Universal Asynchronous Receiver); 23, a keyboard controller (KBC); and 24, a display controller (DISP-CONT). A video RAM (VRAM) 25 is supplied with a backup power (VBK), and stores display image data.

A power source control interface (PS-IF) 28 connects the power source circuit 30 to the CPU 11 through the system bus 10. Upon receiving, from the power control CPU 306 in the power source circuit 30, power source abnormality data such as the cutoff of the power, and a low battery, the PS-IF 28 outputs an NMI (Non-Maskable Interrupt) signal, corresponding to the contents of the abnormality information, to the host CPU 11.

A power source adapter (AC adapter) 29 rectifies and smoothes commercially available alternating current (AC) to obtain direct current power of a predetermined potential.

The AC adapter 29 is plugged in the personal computer main body. The power source circuit 30 supplies power to the respective components of the computer apparatus.

A battery 31A serves to operate as a main battery (M-BATT), comprises a rechargeable battery, and is removably connected to the power source circuit 30. A battery 31B serves, to operate as a sub-battery, comprises a rechargeable battery, and is incorporated in the main body. A floppy disk drive (FDD) 32 is connected to the floppy disk controller 20F. A external floppy disk drive 33 is connected to the external floppy disk drive 33 as the necessity requires. A printer 34 is connected to the printer controller 21 as the necessity requires. An interface unit 35 is connected to the input/output interface 22 as the necessity requires, and comprises an RS-232C interface unit, etc. A keyboard 36 is connected to the keyboard controller 23. A PDP 37 is connected to the display controller 24. A CRT 38 is connected to the display controller 24 as the necessity requires. An extension unit is connected to an extension connector 40 as the necessity requires.

Figure 2:
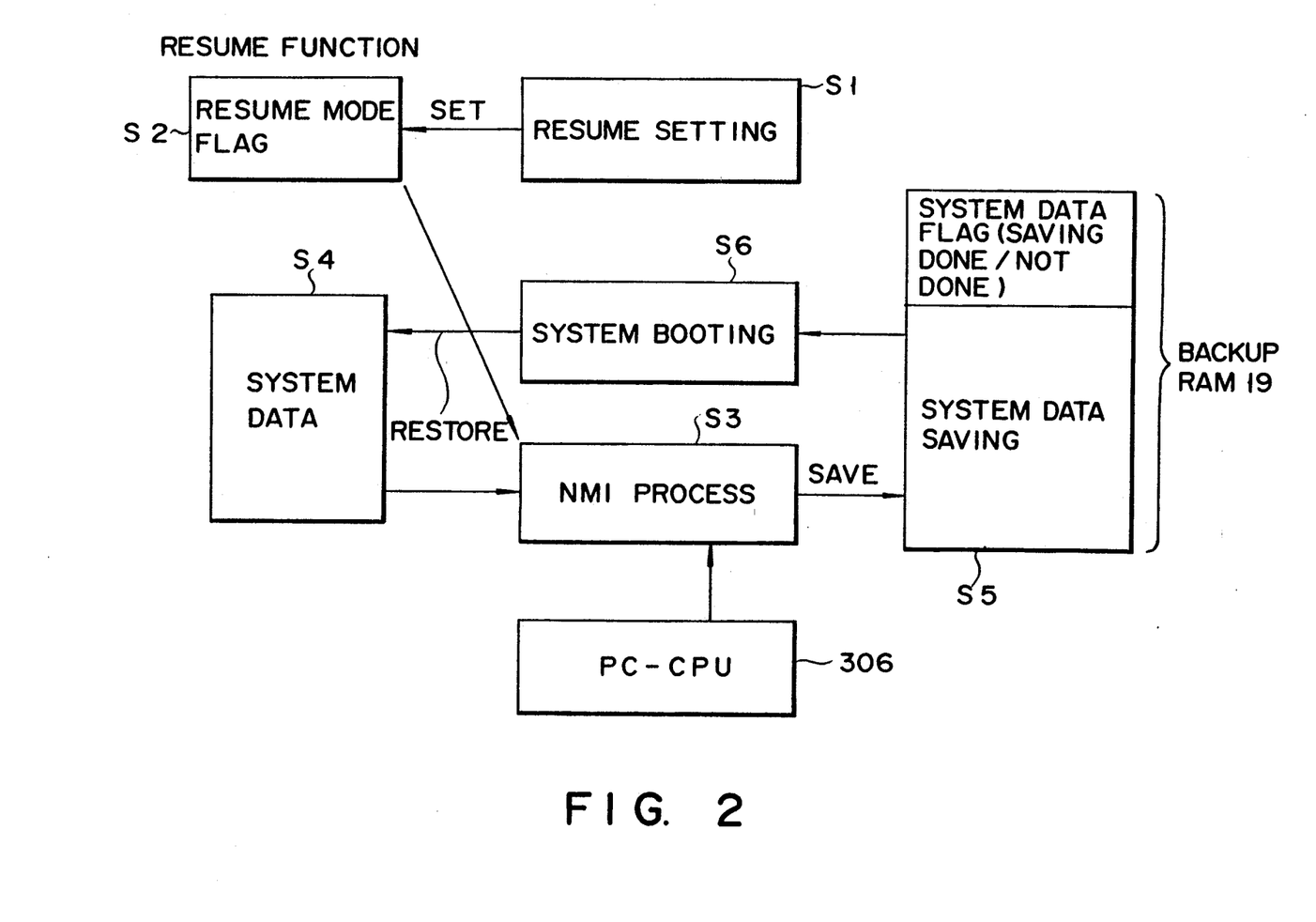
FIG. 2 is a conceptual view showing an outline of a resume processing according to the resume control system and of the present invention.

FIG. 2 is a conceptual view for explaining an operation of a resume control system.

In the set-up mode, the resume function is set to be enabled or disabled by a predetermined key operation, the input of a command, and the like (step S1). As a result, a resume mode flag indicative of the set mode in the step S1, is stored in the the CMOS RAM of the RTC 17.

The power control (PC) CPU (PC-CPU) 306 provided in the power source circuit 30 monitors at all times the on/off state of the power sources provided in the computer system, irrespective of the on/off state of the main power source thereof. Upon detecting the abnormality of the power source, such as the cutoff of the power and the abnormal power source voltage, the PC-CPU 306 supplies the power control interface 28 with signals indicative of the occurrence of abnormality and the kind of the abnormality. Further, when a power switch 301 is turned off, the PC-CPU 306 supplies a signal indicative of it to the power control interface unit 28.

Upon receiving the signal from the PC-CPU 306, the power control interface 28 outputs the NMI signal to the host CPU 11 in accordance with the contents thereof.

Upon receiving the NMI signal, the host CPU 11 executes the NMI processing. More specifically, upon receiving the NMI signal indicative of the abnormality of the power sources, the CPU 11 starts the resume function, and stores in the backup RAM 19 the system data, data required for the data processing being executed including the contents of CPU registers, various LSI data, the value of a program counter, and the like. The CPU 11 also saves in the RAM 19 a system data flag indicating that the system data has been stored.

Moreover, upon receiving the NMI signal indicative of the OFF state of the power switch 301 (that is, indicating that the system operation is normally completed), the CPU 11 refers to the resume mode flag. If the resume mode flag is ON (enable), the CPU 11 saves the system data in the backup RAM 19, and sets the system data flag indicating that the data has been saved. Then, the CPU 11 supplies a signal to the PC-CPU 306 to perform the power-off processing.

On the other hand, if the resume mode flag is OFF, the CPU 11 executes the power-off processing without carrying out the resume processing.

When the power switch 301 is again turned on, or if the power source voltage is recovered to the predetermined value, the CPU 11 executes system boot processing, in which processing the CPU 11 refers to the system data stored in the backup RAM 19.

Then, the operation of this embodiment will be explained with reference to FIGS. 3 to 5.

FIG. 3 shows a flowchart of the NMI processing.

In a step A1, the CPU 11 determines the operation mode thereof. More specifically, the CPU 11 determines whether or not the aforementioned protection enabling bit is set. If the bit is set, the CPU operation mode is determined to be the protective virtual address mode, whereas if the bit is not set, it is determined to be the real address mode. Then, in a step A2, the CPU 11 is set to operate in a predetermined mode. In the embodiment, the resume control program is set to be executed in the real address mode. Thus, the CPU 11 is set in the step A to operate in the real address mode to thereby execute the resume control program.

Then, the CPU 11 determines in a step A3 whether or not the resume mode flag is set. If the flag is set, the CPU 11 saves the system data in the backup RAM 19 in step A4. The system data includes the contents of the CPU registers, the various LSI data, the value of the program counter, and the CPU operation mode determined in the step A1. In step A5, the CPU 11 outputs a power-off command to the power source circuit 30.

FIG. 4 shows a flowchart of the power-on processing.

In step B1, the CPU 11 refers to the system data flag, thereby determining whether or not the resume processing has been executed. If it is determined that the resume processing has been done, the CPU 11 restores the system data stored in the backup RAM 19 in step B2.

In step B3, the CPU 11 is set to operate in the mode determined in the step A1. In step B4, the CPU 11 returns to the program interrupted by the NMI processing, and executes a command subsequent to the interrupted command.

FIG. 5 shows a flowchart of setting the resume flag to be determined in step A3 of FIG. 3. This setting is carried out in the system set-up processing.

The CPU 11 displays an inquiry menu on a PDP 37 in step C1, and in the next step C2 determines whether or not the resume mode is enabled by an input means of a keyboard or the like. If it is determined that the resume mode is enabled, the CPU 11 sets, in step C3, the resume mode flag. On the other hand, if it is determined in the step C2 that the resume mode is disabled, the CPU 11 resets, in step C4, the resume mode flag.

Note that in the above-described embodiment, the resume control program is set to be executed in the real address mode, and the operation mode of the CPU 11 is set to the real address mode in the step A2 to thereby execute the resume control program. However, the present invention is not limited to the above embodiment. The resume control program may be executed in the protective virtual address mode, and accordingly the CPU 11 may be set in the step A2 to operate in the protective virtual address mode.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A resume control method for a portable computer provided with a central processing unit (CPU) operable in at least first and second modes wherein in said first mode the CPU accesses a first memory address space, and in said second mode the CPU accesses a second memory address space larger than the first memory address space, the CPU being capable of executing a resume processing program upon an interrupt in processing, said program set to be examined in one of the first and second modes comprising the steps of:
   a) determining and saving in a backup memory either the first mode or the second mode depending on which mode the CPU is operating in, by referring to data indicating either the first or the second mode, upon occurrence of an interrupt signal;
   b) setting the CPU to operate in one of the first and second modes in which the resume processing program can be executed;
   c) saving, upon the occurrence of the interrupt signal, system data indicative of conditions in which the CPU had been operating prior to the occurrence of the interrupt signal;
   d) restoring the system data saved in the step c), in response to a power-on signal;
   e) setting the CPU to operate in the same mode as the CPU had been operating upon the occurrence of the interrupt signal; and
   f) resuming the interrupted processing.

2. The method according to claim 1, further comprising:
   g) detecting a powering-off sequence of the portable computer; and
   h) supplying the CPU with an interrupt signal responsive to the powering-off sequence.

3. The method according to claim 1, further comprising the steps of:
   setting a resume processing means to a state of either enabled or disabled; and
   executing the resume processing program if the resume processing means is set to be enabled.

4. The method according to claim 1, wherein the resume processing program is executable in a real address mode wherein an application program can access a memory address space within a 1 M byte range, and not executable in a protective virtual address mode wherein an address space larger than 1 Mbyte can be directly accessed by the CPU, and in stpe b) the CPU is set to operate in the real address mode.

5. The method according to claim 1, wherein the interrupt signal includes an NMI (Non-Maskable Interrupt) signal.

6. A computer apparatus, comprising:
   a central processing unit (CPU) operable in at least first and second modes wherein in said first mode the CPU accesses a first memory address space and in said second mode the CPU accesses a second memory address space larger than the first memory address space, the CPU being capable of executing a resume processing program set to be executed in one of the first and second modes;
   power source means, connected to the CPU, for supplying power to the CPU;
   detecting means, connected to the power source means, for detecting a status of power in the power status means;
   storing means, connected to the detecting means, for storing the first or the second mode depending on which mode the CPU is operating in, upon detection of a change of the status of power in the power source means;
   setting means, connected to the CPU, for setting the CPU to operate in one of the first and second modes in which the resume processing program can be executed;
   saving means, connected to the CPU and the detecting means, for saving system data indicative of conditions of a program which was being executed by the CPU upon the detection of a power-down signal;
   restoring means, connected to the detecting means and the saving means, for restoring the saved system upon the occurrence of a power-on signal; and
   means, connected to the restoring means, for resuming the processing which was being executed by said CPU from a state when the system data has been saved, in accordance with the system data restored by said restoring means.

7. The apparatus according to claim 6, further comprising means for supplying the CPU with an interrupt signal responsive to a change of the status of power in the power source means.

8. The apparatus according to claim 7, wherein a change of the status of power in the power source means includes an abnormal state of the power.

9. The apparatus according to claim 6, further comprising:
   means for setting a resume processing means to a state of either enabled or disabled; and
   means for executing a resume processing program if the resume processing means is set enabled.

10. The apparatus according to claim 6, wherein the resume processing program is executable in a real address mode, and not executable in a protective virtual address mode, and wherein the setting means includes means for setting the CPU to operate in the real address mode.

11. A resume control method for a personal computer provided with a central processing unit (CPU) operable in at least first and second modes wherein in said first mode the CPU accesses 1 mega-byte memory address space and in said second mode the CPU accesses a second memory address space larger than the 1 megabyte memory address space, the CPU being capable of executing a resume processing program upon an interrupt in processing, said program set to be executed in one of said first and second modes comprising the steps of:
a) determining and saving in a backup memory either the first mode or the second mode depending on which mode the CPU is operating in by referring to data indicating the first or the second mode, in response to an interrupt signal;
b) setting the CPU to operate in the one of said first and second modes in which the resume processing program can be executed;
c) saving, upon the occurrence of the interrupt signal, system data indicative of conditions in which the CPU had been operating prior to the occurrence of said interrupt signal;
d) restoring the system data saved in the step c), in response to a power-on signal;
e) setting the CPU to operate in the same mode as the CPU had ben operating upon the occurrence of the interrupt signal; and
f) resuming the processing interrupted upon the occurrence of the interrupt signal.

12. The method according to claim 11, wherein the first mode is a real address mode and the second mode is a protective virtual address mode.

13. A computer apparatus, comprising:
a central processing unit (CPU) operable in at least first and second modes wherein in said first mode the CPU accesses a first memory address space of 1 mega bytes and in said second mode the CPU accesses a second memory address space of more than 1 mega bytes, said CPU being capable of executing a resume processing program upon an interrupt in processing, said program set to be executed in one of the first and second modes;
power source means, connected to the CPU, for supplying power to the CPU;
detecting means, connected to the power source means, for detecting a status of power in the power source means;
storing means, connected to the detecting means, for storing the first or the second mode in which the CPU is operating, upon detection of a change of the status of power in the power source means;
setting means, connected to the CPU, for setting the CPU to operate in one of the first and second modes in which the resume processing program can be executed;
saving means, connected to the CPU and the detecting means, for saving system data indicative of conditions of a program which has been executed by the CPU upon the detection of the change of the status of power in the power source means;
restoring means, connected to the detecting means and the saving means, for restoring the saved system data in response to a power-on signal; and
means, connected to the restoring means, for resuming the processing which has been executed by said CPU at a state in which the system data has been saved, in accordance with the system data restored by said restoring means.

14. A method for controlling the operation of a portable computer system, the computer system including a central processing unit (CPU) operable in at least first and second modes, wherein in said first mode the CPU accesses a first memory address space, and in said second mode the CPU accesses a second memory address space, a memory and a plurality of input/out devices, the method comprising the steps of:
a) detecting an occurrence of an interrupt signal;
b) saving, in the memory, a state in which the CPU is operating, in response to the interrupt signal;
c) setting the CPU in one of the first and second modes in which an interrupt processing can be executed; and
d) saving the states of devices to be powered down or suspended in the memory.

15. The method according to claim 14, further comprising the step of determining the type of the interrupt signal which has occurred.

16. The method according to claim 15, wherein the determining step comprises the step of checking whether the interrupt signal is initiated by an abnormality of a power source.

17. The method according to claim 16, wherein the abnormality of the power source includes an abnormally low battery state of the power source.

18. The method according to claim 16, wherein the abnormality includes the off-state of a power switch.

19. The method according to claim 14, wherein the interrupt processing includes a program for resume function.

20. The method according to claim 19, further comprising the step of setting the resume function to be either enabled or disabled.

21. The method according to claim 19, further comprising the step of accessing system configuration data stored within the memory to determine whether the resume function has been set.

22. The method according to claim 14, further comprising the steps of:
determining whether there exists a reset signal or system booting signal caused by a system event;
restoring the system to a state existing at the time the system was suspended or powered down; and
resuming operating of the system at the interrupted point at which it was powered down or suspended.

23. The method according to claim 22, wherein the system event includes an on-state of a power switch.

24. The method according to claim 22, wherein the system event includes a normal supplement state of the power source to the system.

25. The method according to claim 22, wherein the restoring step comprises the steps of:
setting the CPU to operate in the same mode as the CPU had been operating at the time of occurrence of the interrupt signal; and
initializing, in response to the presence of the reset signal or system booting signal, the powered down or suspended devices in accordance with the system data saved in the memory before the system was lowered down or suspended.

26. The method according to claim 22, further comprising a second step of determining whether password data has been inputted to the system before execution of the restoring step.

27. The method according to claim 22, further comprising a third step of determining whether a system data flag has been set in the memory before the system is powered down or suspended.

28. The method according to claim 22, further comprising a step of preventing a resuming process from the state of the suspended or powered down system upon the occurrence of a powering-off sequence of the portable computer system.

29. The method according to claim 14, further comprising the step of setting a system data flag prior to being powered down in response to the saving step, thereby suspending the operation of the computer system.

30. The method according to claim 14, wherein the setting step comprises a step of setting the CPU to operate in said first mode in which the interrupt processing can be executed.

31. The method according to claim 14, wherein the memory includes a back-up memory for saving the state of the CPU and said devices.

32. The method according to claim 14, wherein the interrupt signal includes an NMI (Non-Maskable Interrupt) signal.

33. In an information processing system including a central processing unit (CPU), a memory, and a plurality of input-output devices, the CPU operating in a first mode in which the CPU accesses a first memory address space, and a second mode in which the CPU accesses a second memory space larger than the first memory address space, the CPU being capable of executing a resume process in one of the first and second modes, a method of controlling the operation of the information processing system comprising the steps of:
a) detecting the initiation of a power-off sequence of the information processing system;
b) accessing system status data stored within the memory to determine whether a resume mode is set;
c) saving, in response to the resume mode being set, the states of the plurality of input-output devices, and registers in said memory;
d) setting the CPU to be in one of the first and second modes in which the resume process can be executed;
e) detecting the application of power to the system;
f) determining whether the system is to be resumed to the saved states;
g) restoring, in response to a determination that the system is to be resumed to the saved states of each of the plurality of input-output devices and register to the states existing at the time the system was suspended; and
h) resuming operation of the system at the point at which it was suspended in response to the restoring step.

34. A system for controlling the execution of an application program in an information processing system including a a central processing unit (CPU), a memory, and a plurality of input-output devices, the CPU operating in a first mode in which the CPU accesses a first memory address space, and a second mode in which the CPU accesses a second address memory space larger than the first memory address space, said CPU being capable of executing a resume process in one of the first and second modes, the controlling system comprising:
means for detecting the initiation of a power-off sequence of the information processing system;
means for accessing system status data stored within the memory to determine whether a resume mode is set;
means for saving, in response to the resume mode being set, the state of the plurality of input-output devices and registers in the memory;
means for setting the CPU in one of the first and second modes in which the resume process can be executed;
mean for detecting an application of power to the system;
means for determining whether the system is to be resumed to the saved state;
means for restoring, in response to a determination that the system is to be resumed to the saved states of each of the plurality of input-output devices and registers to the states existing at the time the system was suspended; and
means for resuming operation of the system at the point at which it was suspended in response to the restoring step.

35. A system for controlling an execution of an application program in an information processing system including a central processing unit (CPU), a memory and an input-output device, the CPU operating at least in a first address mode in which the CPU accesses a first memory address space, and a second address mode in which the CPU accesses a second address memory space larger than the first memory address space, the controlling system comprising:
means for activating an interrupt processing of the system;
means for saving, in the memory, a state in which the CPU is operating, in response to the activating means;
means for setting the CPU in one of the first and second address modes in which the invoked interrupt processing is being executed; and
means for saving a state of the device which is to be powdered down or suspended in the memory.

36. A system according to claim 35, further comprising means for determining the type of said interrupt processing.

37. A system according to claim 36, wherein the determining means includes means for checking whether the interrupt processing is activated by an abnormality of a power source.

38. A system according to claim 37, wherein the abnormality of the power source includes an abnormally low battery state of the power source.

39. A system according to claim 35, further comprising:
means for determining whether a reset process or system booting process has occurred due to a system event;
means for restoring the system to a state existing at the time the system was suspended or powered down; and
means for resuming operating of the system at the interrupted point at which it was powered down or suspended.

40. A system according to claim 39, wherein the restoring means includes means for setting the CPU to operate in the same address mode as the CPU had been operating in at the time of the occurrence of the interrupt process; and
initializing, in response to the presence of the rest process or system booting process, the powered down or suspended device in accordance with system data saved in said memory before the system was powered down or suspended.

41. A system according to claim 35, wherein the means for activating said interrupt processing includes a program used for performing a resume function.

42. A system according to claim 35, wherein the setting means includes means for setting the CPU to operate in the first address mode in which the application program can access an address space within a 1-Mbyte range.

43. A system according to claim 35, further comprising means for determining the address mode in which the CPU is being executed in response to the activation of said interrupt processing.

44. A system according to claim 35, wherein said memory includes a backup memory supplied with power by a backup power source upon power down or suspension of said devices.

45. A method of operating a computer system, the computer system having at least first and second address modes, the first address mode being a mode in which an application program can access a first address space having a 1 Mbyte range, the second address mode being a mode in which a second address space larger than 1 Mbyte can be directly accessed by a CPU, comprising the steps of:
saving the operating state of the CPU into a separate memory, independent of the amine system memory, thereby activating an interrupt process;
setting the CPU into the first address mode after saving the operating state of the CPU; and
executing a power management function in the first address mode.

46. A method according to claim 45, wherein the execution of said power management function comprises the step of saving a state of a device into the memory before the device is powered down or suspended.

47. A method according to claim 45, further comprising the steps of:
reloading the saved CPU state in response to a system event; and
resuming an interrupted application program.

48. A computer system comprising:
a CPU having a physical address space larger than 1-Mbyte;
a main system memory having a physical address space larger than 1-Mbyte;
addressing means, coupled to the CPU, for addressing the system memory, the addressing means including a first address mode in which an application program can access the address space having the 1 Mbyte range, and a second address mode in which an address space larger than 1 Mbyte can be directly accessed by the CPU;
means for saving the operating state of the CPU into a separate memory, independent of the main system memory, thereby activating an interrupt process;
means for setting the CPU into the first address mode after saving the operating state of the CPU; and
means for executing a power management function in the first address mode.

49. A computer system according to claim 48, wherein the means for executing said power management function includes means for saving a state of a device into the separate memory before the device is powered down or suspended.

50. A computer system according to claim 49, further comprising:
means for reloading the saved CPU state in response to a system event; and
means for resuming an interrupted application program.

* * * * *

UNITED STATES PATENT AND TRADEMARK OFFICE
CERTIFICATE OF CORRECTION

PATENT NO. : 5,276,890
DATED : January 04, 1994
INVENTOR(S) : Makoto Arai

It is certified that error appears in the above-indentified patent and that said Letters Patent is hereby corrected as shown below:

Column 8, lines 18-19, change "the power status means" to --the power source means--.

Column 10, line 55, change "lowered down" to --powered down--.

Column 12, line 12, change "restoring step" to --restoring means--.

Column 13, lines 21-22, change "the amine system memory" to --a main system memory--.

Signed and Sealed this

Twenty-seventh Day of September, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,276,890
DATED : JANUARY 04, 1994
INVENTOR(S) : MAKOTO ARAI

It is certified that error appears in the above-indentified patent and that said Letters Patent is hereby corrected as shown below:

Column 1, line 61-62, delete "Alternatively, it costs a lot to"
Column 1, line 66, after "mode." insert --Alternatively, it costs a lot--

Signed and Sealed this

Second Day of May, 1995

Attest:

BRUCE LEHMAN

Attesting Officer

Commissioner of Patents and Trademarks